US012781062B2

(12) United States Patent
Yeung et al.

(10) Patent No.: US 12,781,062 B2
(45) Date of Patent: Nov. 3, 2026

(54) MULTILEVEL ANTIMICROBIAL POLYMERIC COLLOIDS AS FUNCTIONAL ADDITIVES FOR LATEX COATING

(71) Applicant: THE HONG KONG UNIVERSITY OF SCIENCE AND TECHNOLOGY, Hong Kong (CN)

(72) Inventors: King Lun Yeung, Hong Kong (CN); Dengyu Ji, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 993 days.

(21) Appl. No.: 17/941,217

(22) Filed: Sep. 9, 2022

(65) Prior Publication Data

US 2023/0087431 A1 Mar. 23, 2023

Related U.S. Application Data

(60) Provisional application No. 63/243,204, filed on Sep. 13, 2021.

(51) Int. Cl.
*C09D 5/14* (2006.01)
*C09D 7/40* (2018.01)
(Continued)

(52) U.S. Cl.
CPC ................ *C09D 5/14* (2013.01); *C09D 7/65* (2018.01); *C09D 7/69* (2018.01); *C09D 7/80* (2018.01); *C09D 129/04* (2013.01)

(58) Field of Classification Search
CPC ............................... C09D 5/14; C09D 129/04
See application file for complete search history.

(56) References Cited

U.S. PATENT DOCUMENTS 4,853,978 A * 8/1989 Stockum ................ A61B 42/00 2/167
7,202,287 B2 4/2007 Cornish et al.
(Continued)

FOREIGN PATENT DOCUMENTS

CA 2745191 A1 * 6/2010 ............. A61L 29/16
CA 2745191 C * 1/2017 .......... C10M 105/20
(Continued)

OTHER PUBLICATIONS

Translation CN 111087727 A (Year: 2020).*
(Continued)

*Primary Examiner* — Hoa (Holly) Le
(74) *Attorney, Agent, or Firm* — Nath, Goldberg & Meyer; Joshua B. Goldberg

(57) ABSTRACT

The multilevel antimicrobial polymeric colloids as functional additives for latex coating are latex-based coatings with multilevel antimicrobial polymeric colloidal particles incorporated therein to provide antimicrobial properties. Each multilevel antimicrobial polymeric colloidal particle includes a polymer scaffold and at least one antimicrobial polymer carried on the polymer scaffold, such that the polymer scaffold and the at least one antimicrobial polymer form a hollow colloidal particle. As a non-limiting example, the polymer scaffold may be polyvinyl alcohol (PVA). As a further non-limiting example, the at least one antimicrobial polymer may be a combination of polyethyleneimine (PEI) and polyhexamethylene biguanide (PHMB). Each multilevel antimicrobial polymeric colloidal particle may also contain an antimicrobial core within the hollow colloidal particle.

10 Claims, 11 Drawing Sheets

(51) Int. Cl.

| | |
|---|---|
| ***C09D 7/65*** | (2018.01) |
| ***C09D 7/80*** | (2018.01) |
| ***C09D 129/04*** | (2006.01) |

(56) References Cited

U.S. PATENT DOCUMENTS

| | | | | |
|---|---|---|---|---|
| 7,619,017 | B2 | 11/2009 | Rabasco et al. | |
| 10,842,148 | B2 | 11/2020 | Yeung et al. | |
| 2003/0187095 | A1* | 10/2003 | Cornish | C08K 5/0058 523/122 |
| 2019/0174749 | A1* | 6/2019 | Yeung | A01N 49/00 |
| 2020/0022366 | A1* | 1/2020 | Mendoza Flores | C09D 5/16 |
| 2021/0022969 | A1 | 1/2021 | Yeung et al. | |
| 2021/0156080 | A1 | 5/2021 | Lau et al. | |

FOREIGN PATENT DOCUMENTS

| | | | | | |
|---|---|---|---|---|---|
| CN | 108684660 | A | | 10/2018 | |
| CN | 111087727 | A | * | 5/2020 | B32B 27/08 |
| ES | 2624425 | T3 | * | 7/2017 | C08K 5/17 |
| JP | 2016098349 | A | * | 5/2016 | |

OTHER PUBLICATIONS

Translation JP 2016098349 A (Year: 2016).*

Bromberg, Lev, et al. "Bactericidal core-shell paramagnetic nanoparticles functionalized with poly (hexamethylene biguanide)." Langmuir 27.1 (2011): 420-429.

* cited by examiner

MULTILEVEL ANTIMICROBIAL POLYMERIC COLLOIDS AS FUNCTIONAL ADDITIVES FOR LATEX COATING

CROSS-REFERENCE TO RELATED APPLICATION

This application claims the benefit of U.S. Provisional Patent Application No. 63/243,204, filed on Sep. 13, 2021.

BACKGROUND

1. Field

The disclosure of the present patent application relates to antimicrobial treatments, and particularly to antimicrobial colloidal particles which may be used as additives for latex coatings, paints, and the like.

2. Description of the Related Art

Airborne droplets and aerosols rapidly spread infectious diseases and are responsible for large community outbreaks and pandemics. They also contaminate surfaces with microbes that can remain viable and infectious for days or weeks, thus being inadvertently transmitted to susceptible hosts through touch or air resuspension. For example, methicillin-resistant *S. aureus* (MRSA), multidrug-resistant *P. aeruginosa*, Imipenem-resistant *acinetobacter*, and vancomycin-resistant *enterococcus* plague hospitals and nursing homes and are well known to persist and spread in such environments.

Manual cleaning with approved disinfectants is the current standard of practice in most countries and requires supervision with constant reinforcement and education of environmental management service staff to maintain effectiveness. The shortcomings of this approach are amply demonstrated by a surveillance study showing that even the stringent room cleaning practiced in hospitals involved cleaning less than half of the sampled items. Highly aggressive methods of disinfection exist, such as X-ray enhanced electrostatic fields, cold plasma treatments, microwaves, ultraviolet (UV) irradiation, and ion emission technology, however, these techniques also suffer from problems related to material compatibility (e.g., surface damage and corrosion), the emergence of microbial tolerance and resistance, and the persistence of potentially harmful residues. Thus, multilevel antimicrobial polymeric colloids as functional additives for latex coating solving the aforementioned problems are desired.

SUMMARY

The multilevel antimicrobial polymeric colloids as functional additives for latex coating are a latex-based coatings with multilevel antimicrobial polymeric colloidal particles incorporated therein to provide antimicrobial properties. Each multilevel antimicrobial polymeric colloidal particle includes a polymer scaffold and at least one antimicrobial polymer carried on the polymer scaffold, such that the polymer scaffold and the at least one antimicrobial polymer form a hollow colloidal particle. As a non-limiting example, the polymer scaffold may be polyvinyl alcohol (PVA). As a further non-limiting example, the at least one antimicrobial polymer may be a combination of polyethyleneimine (PEI) and polyhexamethylene biguanide (PHMB). Each multilevel antimicrobial polymeric colloidal particle may also contain an antimicrobial core within the hollow colloidal particle. The core may be made of any suitable type of antimicrobial agent or agents, such as, but not limited to, antimicrobial metals, antimicrobial metal ions, antimicrobial metal oxides, antimicrobial chemicals, plant-derived antimicrobial phytochemicals, silver, silver compounds, silver salts, silver oxides, copper, copper compounds, copper salts, copper oxides, disinfectants, bactericidal short chain polymers, bactericidal short chain oligomers, ionic liquid compounds, alcohols, peracetic acids, essential oils, and combinations thereof.

The multilevel antimicrobial polymeric colloids as functional additives for latex coating are made by mixing a multilevel antimicrobial polymeric colloid into a latex varnish paint. The multilevel antimicrobial polymeric colloid includes the multilevel antimicrobial polymeric colloidal particles in water and, as a non-limiting example, the latex varnish paint may be an acrylate-urethane prepolymer emulsion in water.

An antimicrobial plastic overlay may be formed from a plastic substrate sheet with a primer layer coated thereon, and a topcoat layer coated on the primer layer. Each of the primer layer and the topcoat layer is formed from the multilevel antimicrobial polymeric colloids as functional additives for latex coating. The antimicrobial plastic overlay may be applied to a variety of different materials, such as wood, plastic and the like.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
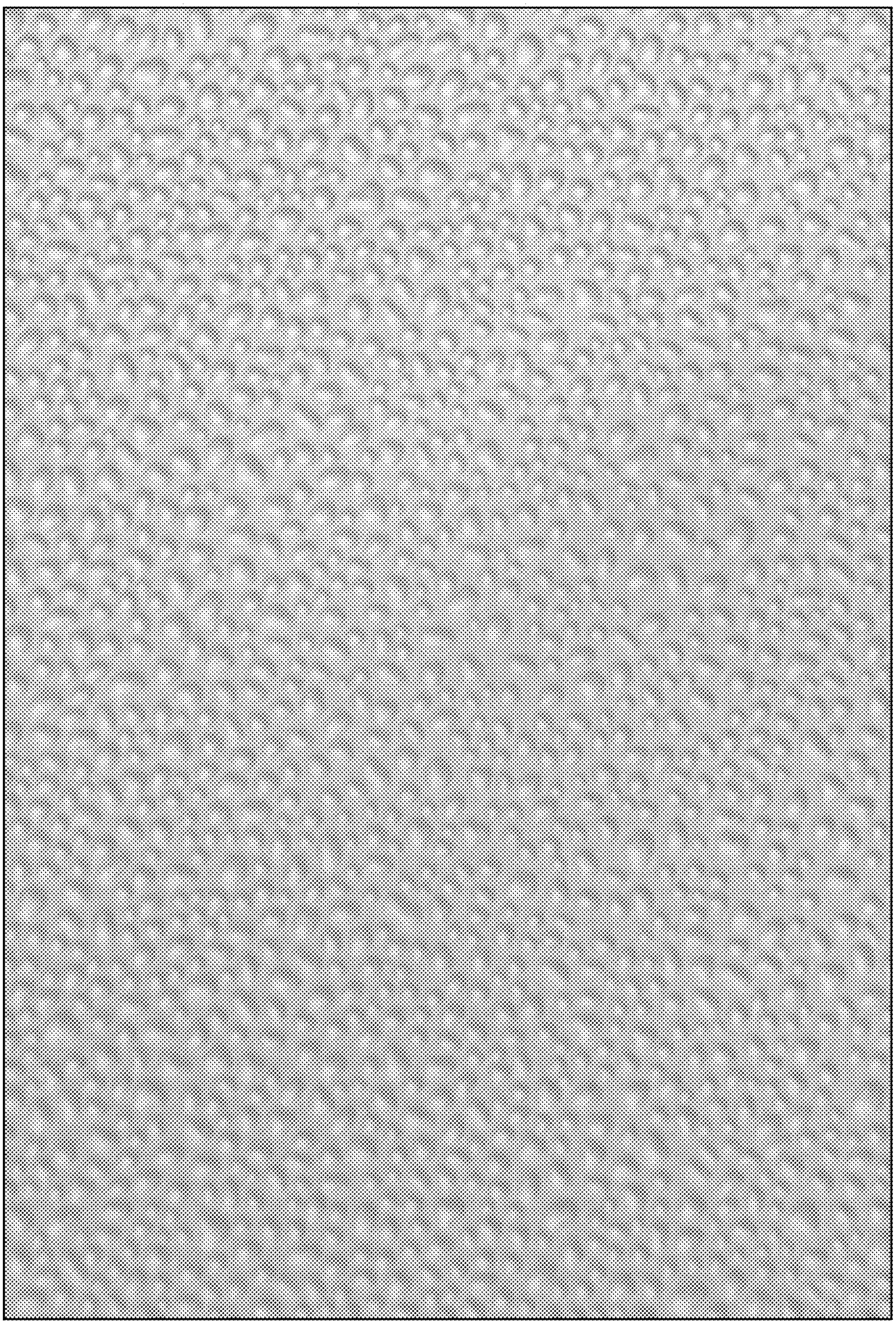
FIG. 1 is a microscope image of stable multilevel antimicrobial polymeric (MAP) colloidal particles with hollow centers after two years of storage at room temperature.

The multilevel antimicrobial polymeric colloids as functional additives for latex coating are latex-based coatings with multilevel antimicrobial polymeric colloidal particles incorporated therein to provide antimicrobial properties. Each multilevel antimicrobial polymeric (MAP) colloidal particle includes a polymer scaffold and at least one antimicrobial polymer carried on the polymer scaffold, such that the polymer scaffold and the at least one antimicrobial polymer form a hollow colloidal particle. As a non-limiting example, the polymer scaffold may be polyvinyl alcohol (PVA). As a further non-limiting example, the at least one antimicrobial polymer may be a combination of polyethyleneimine (PEI) and polyhexamethylene biguanide (PHMB). Each multilevel antimicrobial polymeric (MAP) colloidal particle may also contain an antimicrobial core within the hollow colloidal particle. The core may be made of any suitable type of antimicrobial agent or agents, such as, but not limited to, antimicrobial metals, antimicrobial metal ions, antimicrobial metal oxides, antimicrobial chemicals, plant-derived antimicrobial phytochemicals, silver, silver compounds, silver salts, silver oxides, copper, copper compounds, copper salts, copper oxides, disinfectants, bactericidal short chain polymers, bactericidal short chain oligomers, ionic liquid compounds, alcohols, peracetic acids, essential oils, and combinations thereof. As a non-limiting example, the MAP colloidal particles may have diameters on the order of 600 nm. FIG. 1 is a microscope image of stable MAP colloidal particles with hollow centers after two years of storage at room temperature.

Latex is a stable emulsion of polymer microparticles in water and includes natural and synthetic latexes that find broad uses, such as in paints and coatings. In order to make the multilevel antimicrobial polymeric colloids as functional additives for latex coating, MAP colloids in water were added to a latex varnish paint. The latex varnish paint contained an acrylate-urethane prepolymer emulsion in water. Rapid stirring was used to mix the MAP colloid with the latex varnish paint. The mixture of the liquid multilevel antimicrobial polymeric colloids as functional additives for latex coating was used as both a primer coating and a topcoat paint during testing. The MAP colloid in this experimental example included 4.17 w/w % PVA (Mw 30,000~70,000), 1.33 w/w % PEI (Mn 10,000), 0.33 w/w % PHMB (Mw 2,300), and 94.17 w/w % distilled deionized (DDI) water. The latex varnish paint in this experimental example included an acrylate-urethane prepolymer emulsion in water with a 50 w/w % content, and which was transparent with a low gloss.

Figure 2:
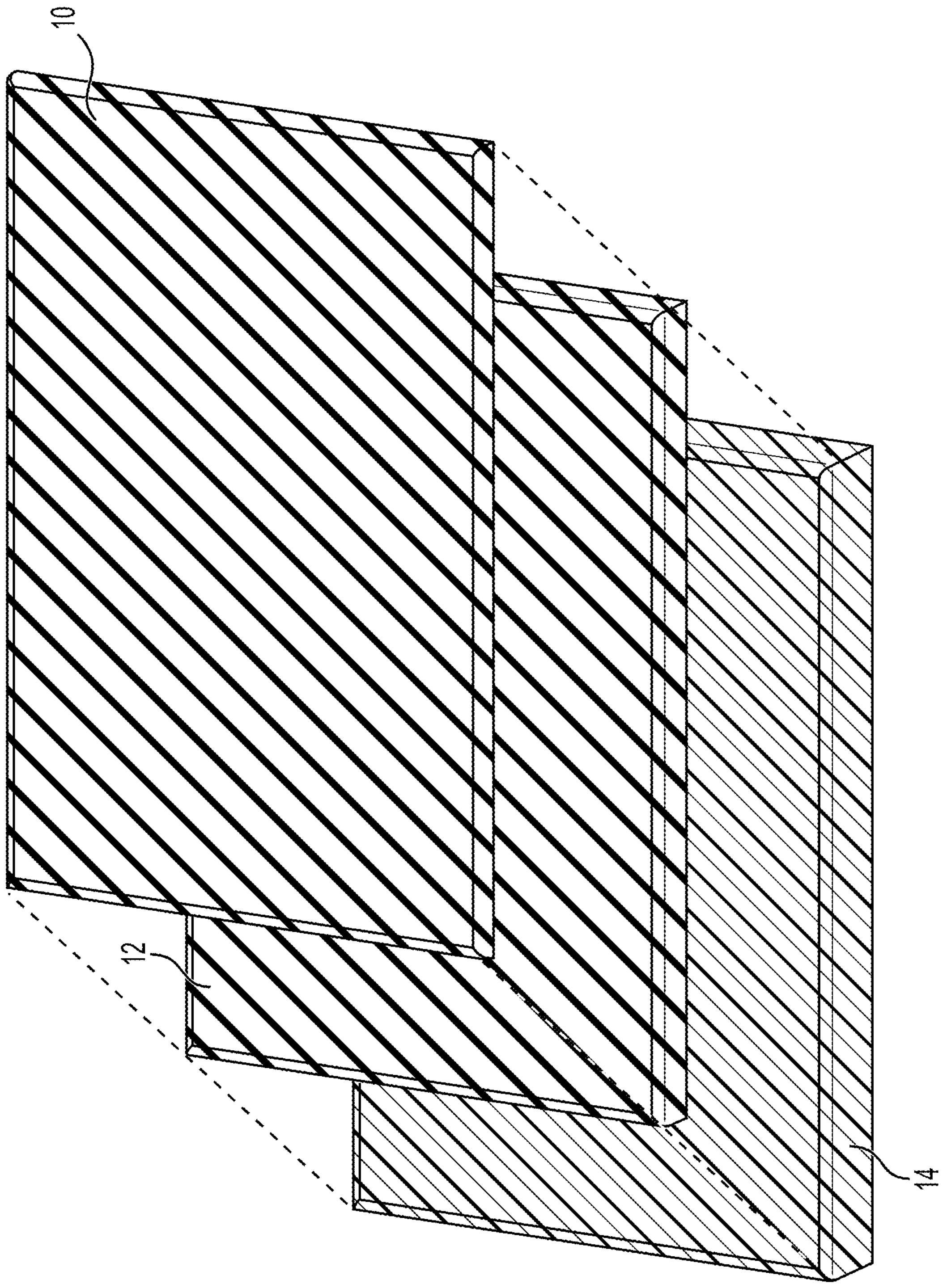
FIG. 2 is an exploded view of a plastic card overlay made with a multilevel antimicrobial polymeric (MAP) colloid and latex coating.

FIG. 2 is an exploded view of a plastic card overlay made with the multilevel antimicrobial polymeric (MAP) colloid and latex coating. In experiments, a plastic sheet 14 served as a substrate for receiving a priming layer 12 and a topcoat layer 10. In experiments, the plastic sheet 14 was formed from polyvinyl chloride (PVC) and polyvinyl acetate (PVAc), with a thickness of 60 μm. The primer layer 12 had a thickness of 10 μm and was coated on the plastic sheet 14. The topcoat layer 10 had a thickness of 5 μm and was coated on the primer layer 12. In liquid form for the coating, primer layer 12 was 10 vol % MAP colloid additive and 90 vol % acrylic urethane latex, and topcoat layer 14 was 80-90 vol % MAP colloid additive and 20-5 vol % acrylic urethane latex.

To make the plastic card overlay, the surface of plastic sheet 14 was cleaned of dirt and dust, and the primer coating layer 12 was applied using a paint roller on the PVC-PVAc plastic sheet 14. The roller traced an "S" track on the sheet 14 and the paint was carefully spread over the surface with the roller before lightly spreading the paint uniformly over the entire surface. When the primer coating 12 was dry to the touch, the topcoat paint 10 was applied using the roller in a similar manner. Paint defects were removed by smoothing out the surface using a wet paint roller. Primer was coated on the plastic sheet 14 at 16 $m^2/L$, and allowed to dry for approximately 30 minutes. The topcoat was applied at 30 $m^2/L$ and, after approximately 7 minutes, the topcoat layer 10 was smoothed using a wet clean paint roller, which was repeated three times to ensure that any defects were removed.

The card plastic overlays were tested for adhesion following the scratch-tear assay of the ISO2409 and ASTM D3359 standards. The coated card plastic overlay was cut with a 2 mm hatch cutter in a lattice pattern before using tape to remove the cut coating. The adhesion resistance against tape tearing was assessed according to the standards and the results are shown below in Table 1 for 7 samples. The results indicate that the MAP colloid latex primer coating and topcoat paint have excellent adhesion strength with all 5B grades out of 7 tests. ASTM D3359 class 5B represents no film pull-off, which is the highest level of coating adhesion.

TABLE 1

Adhesion (scratch-tear) test results

| Sample No. | ASTM D3359 Grade |
|---|---|
| 1 | 5B |
| 2 | 5B |
| 3 | 5B |
| 4 | 5B |
| 5 | 5B |
| 6 | 5B |
| 7 | 5B |

Table 2 below summarizes the bactericidal activity against *E. coli* and *S. aureus*, and antimicrobial activity against the Phi-6 bacteriophage viral particle for different formulated topcoat paints in the MAP colloid and latex coating.

TABLE 2

Topcoat formulation, aesthetic, and antimicrobial activities

| Example No. | $2^{nd}$ layer formula (vol %) Map-1 | Latex | Aesthetics/ homogeneity | Antimicrobial reduction ($log_{10}$) *E. coli* | *S. aureus* | Phi-6 |
|---|---|---|---|---|---|---|
| 1 | 100% | 0% | A | 3.77 | 3.46 | 2.56 |
| 2 | 97% | 3% | A | 3.62 | 3.38 | 2.56 |
| 3 | 95% | 5% | A | 3.53 | 3.30 | 2.56 |
| 4 | 90% | 10% | B | 1.83 | 1.08 | 1.00 |
| 5 | 80% | 20% | C | 0.05 | 0.61 | 0.57 |

In Table 2, the following aesthetics evaluation grades are used: "A" represents a uniformly clear and transparent coating, "B" represents one defect per 10 $cm^2$, and "C" represents more than one defect per 10 $cm^2$, where each grade represents assessment of two samples. Antimicrobial reduction is based on a contact killing test of 10 minutes, averaged over three samples. With regard to aesthetics, testing was performed on samples smoothed three times, every 7 minutes, which was performed to improve coating coverage and remove spots. This was performed for both blank overlay sheets and overlay sheets including magnetic strips (similar to credit cards).

Table 3 below represents the measured thickness of each layer in the experimental samples. The total thickness of the coating (the primer coating and the topcoat paint together) was 14.96±1.48 μm based on 80 measurements on eight coated overlays, with the standard deviation below the suggested roughness range of 1.4~2.2 μm in the card overlay industries. The primer coating accounts for 10.70 μm and the topcoat paint is 4.26 μm.

TABLE 3

Thickness measurements

| Layer | Thickness in micron (n = 10) |
|---|---|
| Primer coating | 10.70 |
| Topcoat paint | 4.26 |
| Primer coating + topcoat paint | 14.96 ± 1.48 |
| Overall thickness including overlay plastic sheet | 74.96 ± 1.48 |

Flatness was determined by placing the coated overlays on a flat bench and the gap between the highest point of the edge and the table was measured. All sheets had no measurable warpage on their edges. With a precision of 0.5 mm, three magnetic strip overlayed sheets had a measured gap of less than 0.1 mm, and eight blank overlayed sheets also had a measured gap of less than 0.1 mm.

Figure 3A:
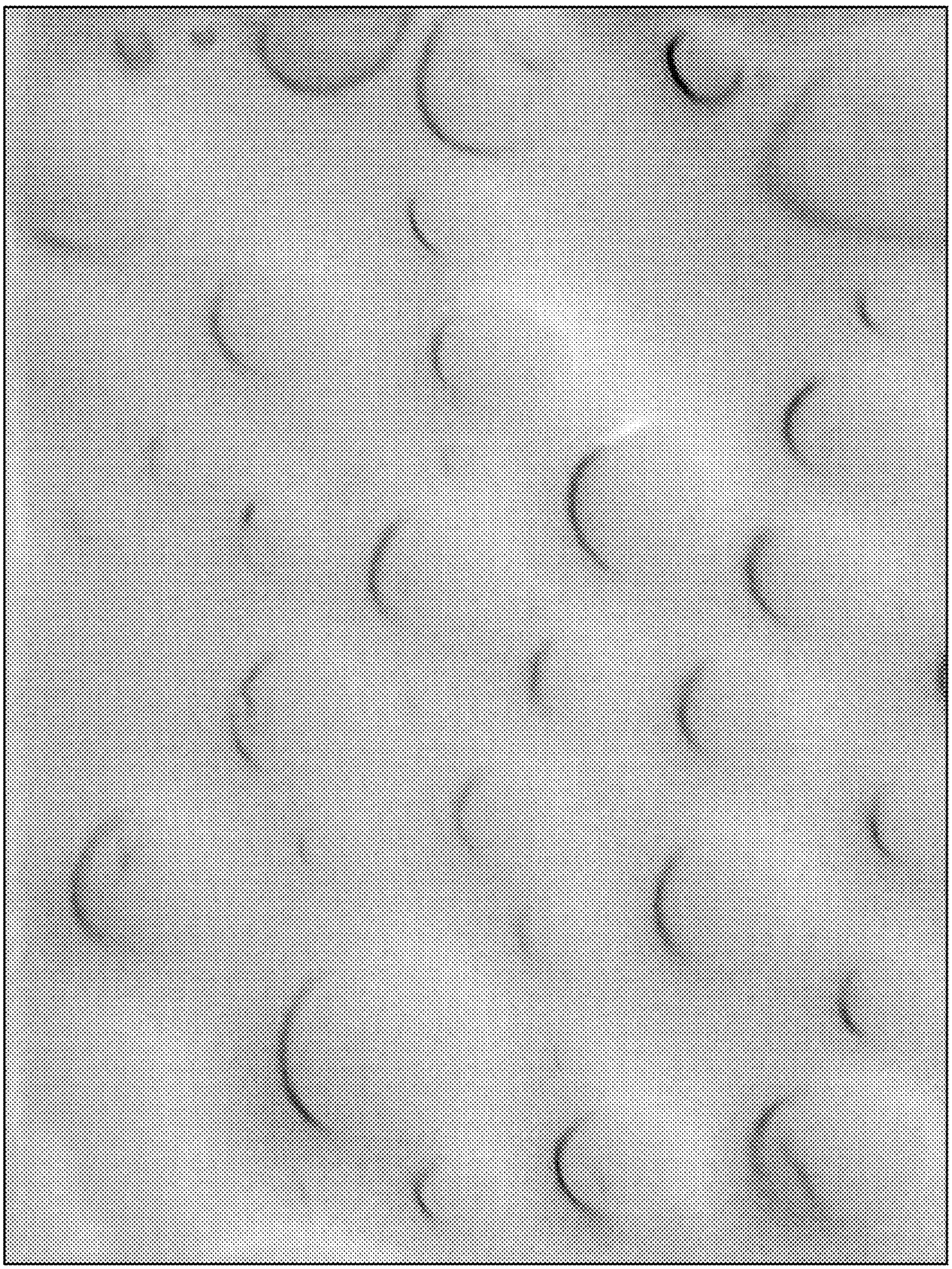
FIG. 3A is a scanning electron microscope image at 6,000× in topographic image mode for a topcoat layer of a plastic card overlay made with a multilevel antimicrobial polymeric (MAP) colloid and latex coating.
Figure 3B:
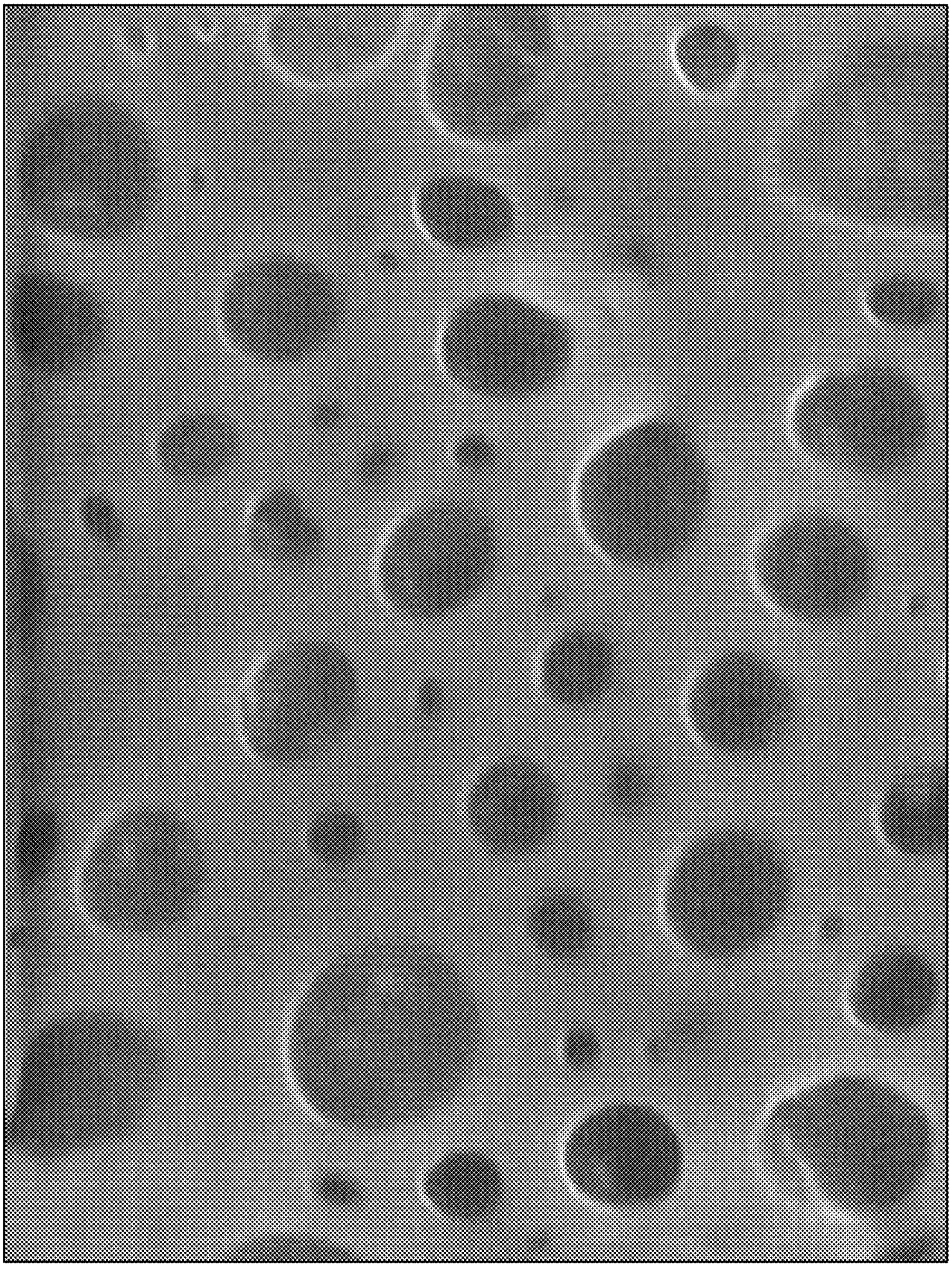
FIG. 3B is a scanning electron microscope image at 6,000× in composition contrast image mode for the topcoat layer of the plastic card overlay of FIG. 3A.

The topcoat paint on the card plastic overlay observed under a Hitachi® TM3030 scanning electron microscope (SEM), as shown in FIGS. 3A and 3B. FIG. 3A displays the image in topographic contrast mode, revealing MAP colloids on the surface. The colloids are further confirmed by the composition contrast image shown in FIG. 3B. The scanning electron microscope used a 15 kV electrical beam (N), in charge-up reduction mode for a non-conductive surface (L), with a 4.4 mm distance (D) from the measuring surface to the detector. The standard bar in FIGS. 3A and 3B is 10 μm. The MAP colloids in the topcoat layer were measured to have an average width (±S.D.) of 1328±353 nm, and an average height (±S.D.) of 1084±759 nm. Micelle width was measured using ImageJ software applied to the SEM images. Micelle height was measured with 3D viewer software from the SEM images. The height was duplicated from the depth measured with a flat surface adjustment in the 3D viewer software.

Figure 4:
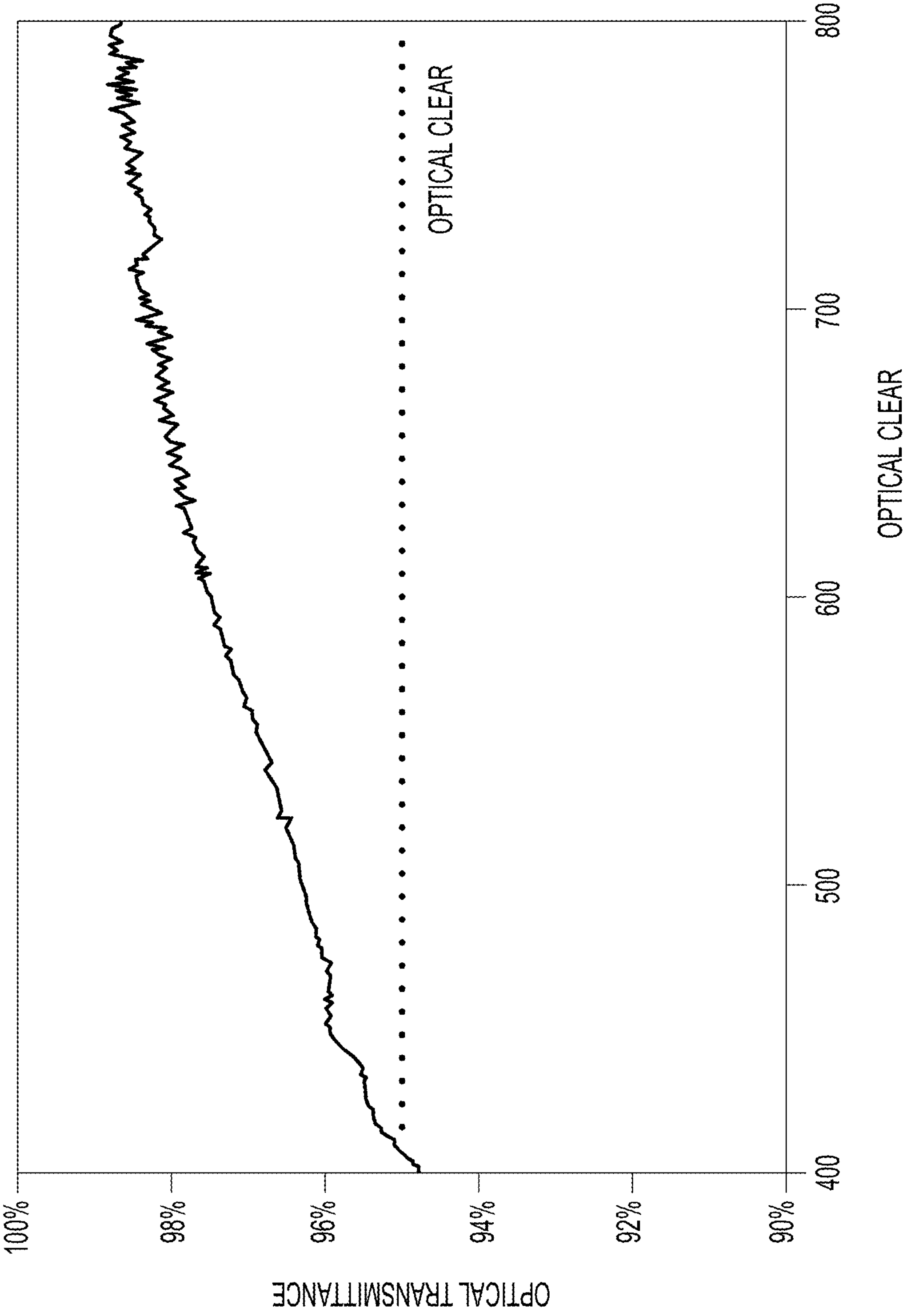
FIG. 4 is a graph showing the measured optical transmittance of the plastic card overlay made with a multilevel antimicrobial polymeric (MAP) colloid and latex coating.

The optical transmittance or transparency was measured by a Varioscan spectrophotometer according to chapter "5.10 Opacity" of the ISO/IEC 10373-1:2006(E) standard. Measurement indicated that card plastic overlays with two layers of primer coating and topcoat paint have a light transmittance above 95% for visible light (i.e., 400-800 nm), as shown in FIG. 4, thus qualifying as "optically clear." In FIG. 4, the results are normalized against a blank card plastic overlay. The dashed line at 95% transmittance is the critical level for "optical clear" in the display industries.

Figure 5A:
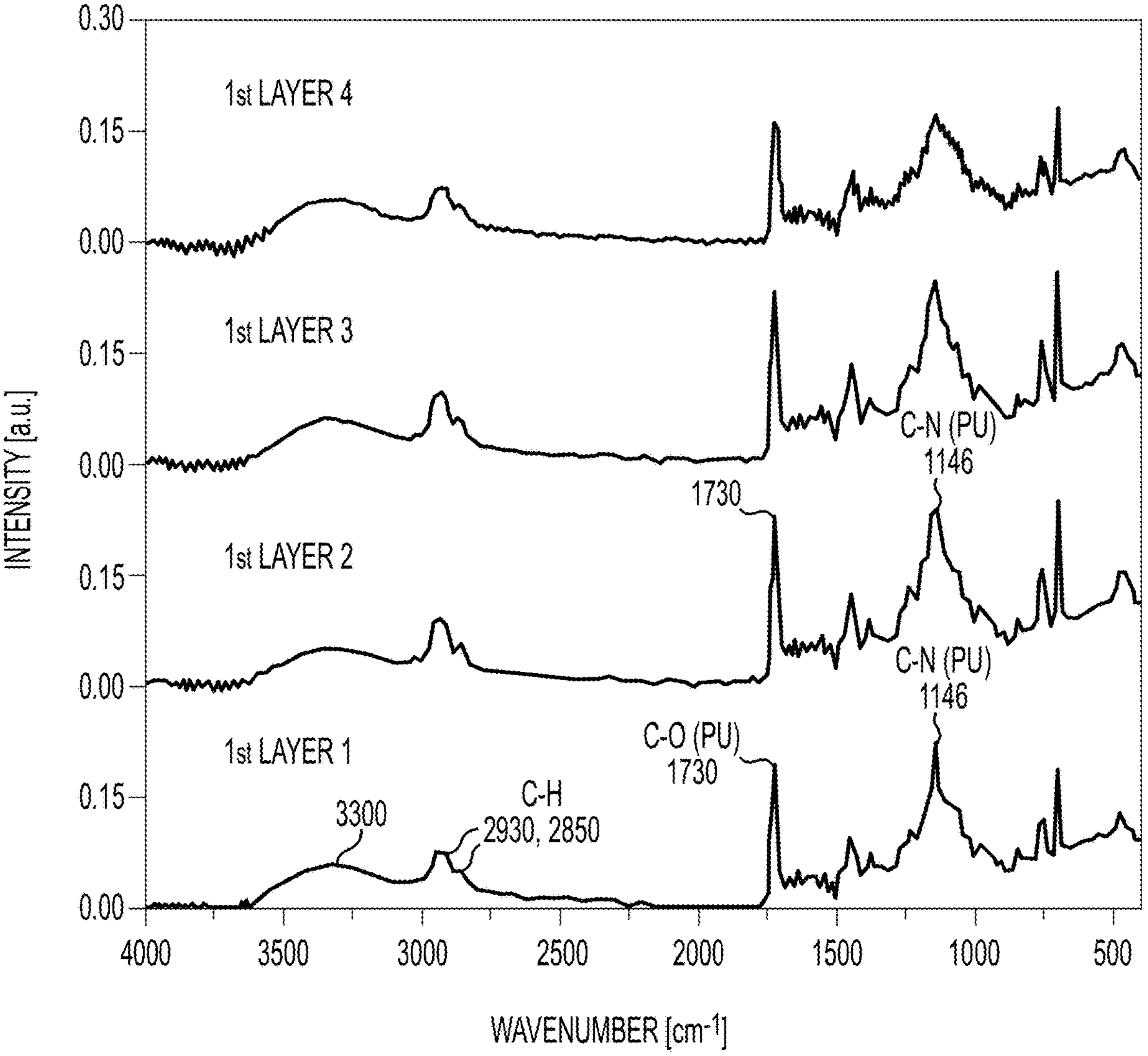
FIG. 5A shows attenuated total reflection-Fourier transformed infrared spectroscopy (FTIR-ATR) spectra for the primer layer of the plastic card overlay made with a multilevel antimicrobial polymeric (MAP) colloid and latex coating.
Figure 5B:
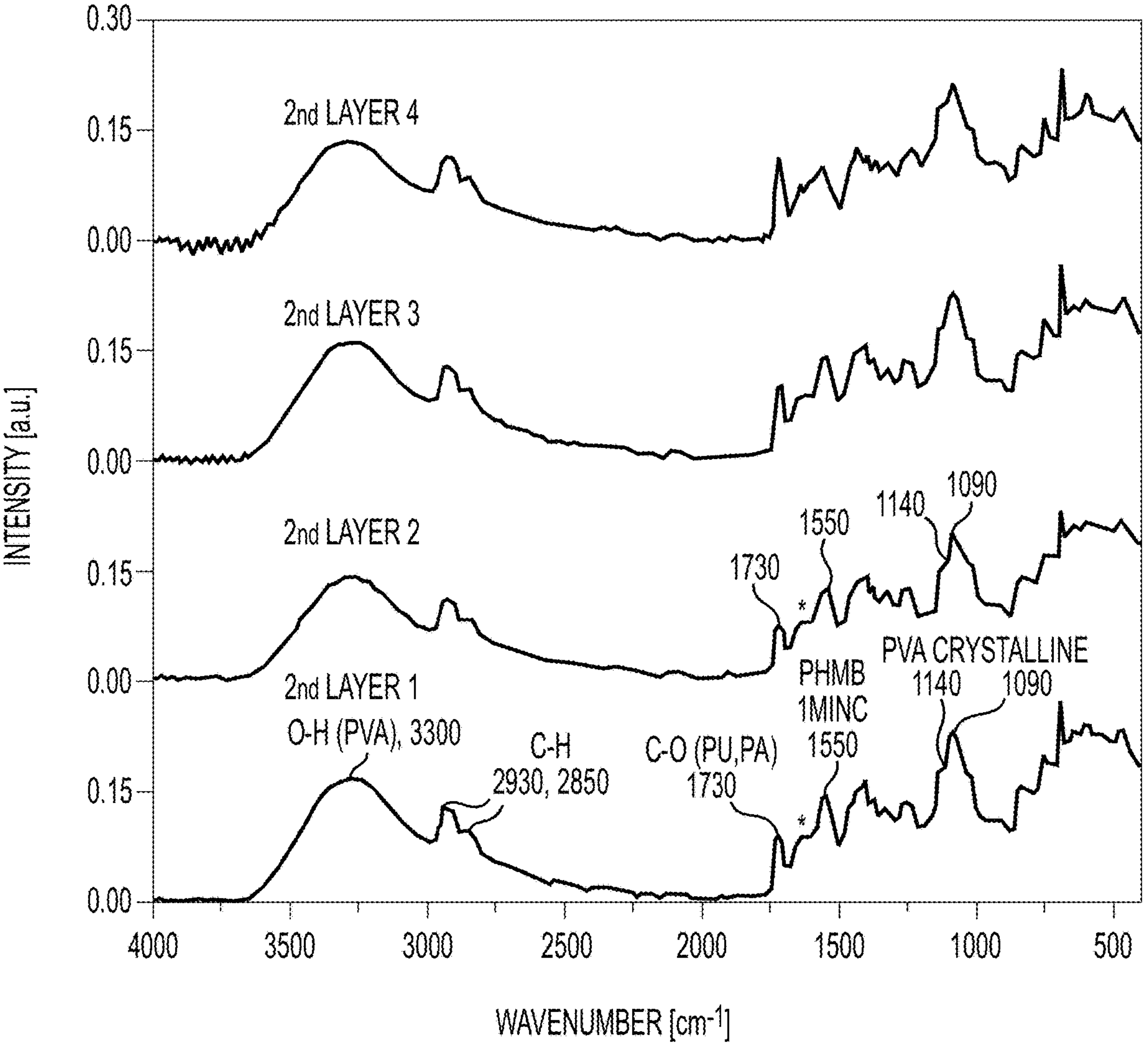
FIG. 5B shows attenuated total reflection-Fourier transformed infrared spectroscopy (FTIR-ATR) spectra for the topcoat layer of the plastic card overlay made with a multilevel antimicrobial polymeric (MAP) colloid and latex coating.

The primer coating and topcoat paint on the card plastic overlay were characterized using attenuated total reflection-Fourier transformed infrared spectroscopy (FTIR-ATR). FIG. 5A shows the spectra collected at four separate locations on the surface of the primer coating. The primer coating was ten microns thick and consisted mostly of polyacrylic-urethane latex (98% w/w). Therefore, the signals from the PVA component of the MAP colloids are weak and only signals belonging to polyurethane at 1146 $cm^{-1}$ (C—N) and 1730 $cm^{-1}$ (C═O) are seen. The spectra taken from the five micron thick topcoat paint in FIG. 5B shows signals at 3300 $cm^{-1}$ attributed to PVA-OH, which constitutes 50% w/w of the layer, with the PEI and PHMB signals appearing at 1650 $cm^{-1}$ and 1550 $cm^{-1}$, respectively. A weak signal at 1730 $cm^{-1}$ belongs to the polyurethane in the topcoat paint.

Figure 6:
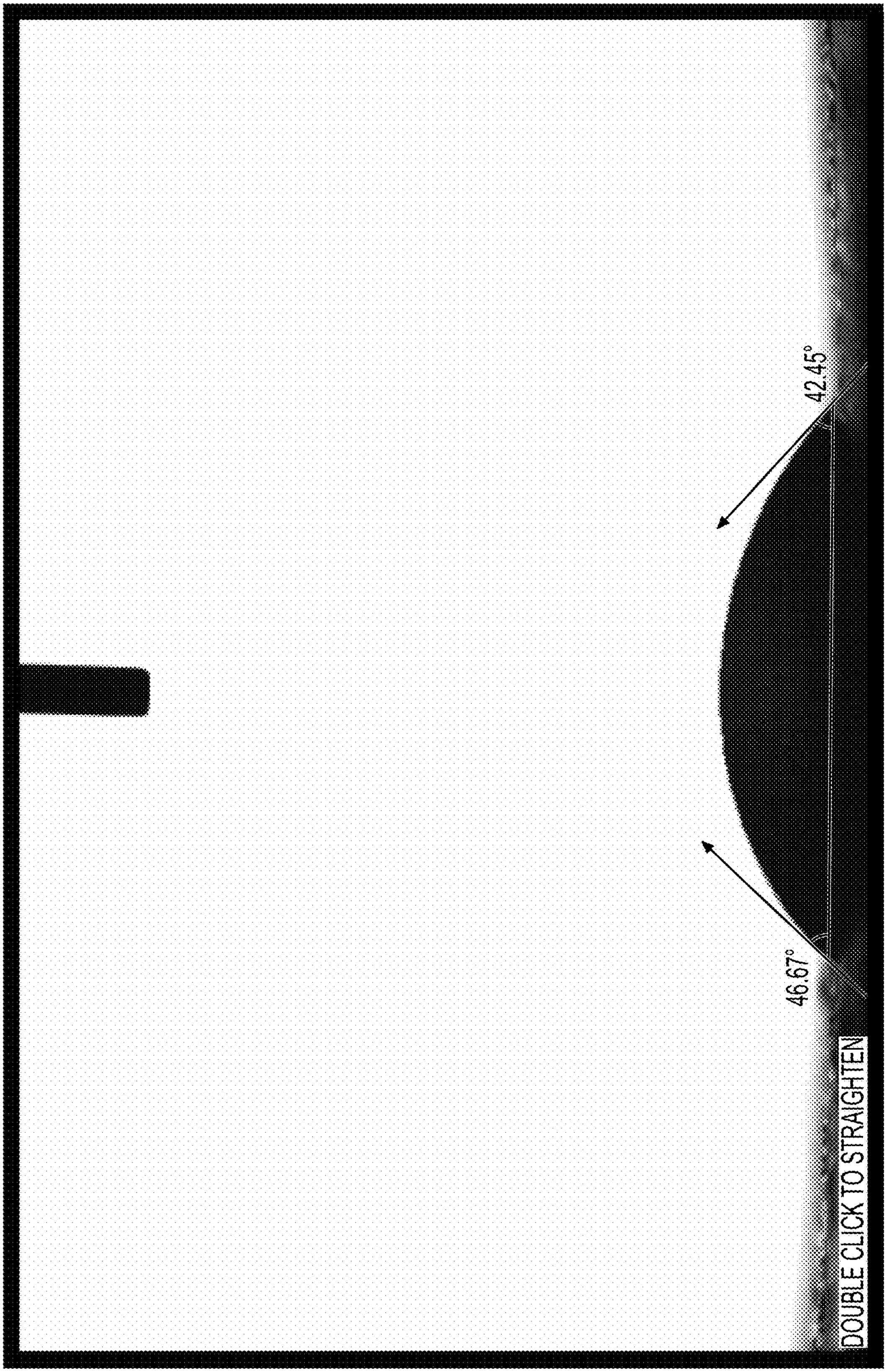
FIG. 6 shows the results of water contact angle measurement of the topcoat layer of the plastic card overlay made with a multilevel antimicrobial polymeric (MAP) colloid and latex coating.

The water contact angles were measured using a Attension® Theta Auto 4 optical tensiometer, manufactured by Biolin Scientific®. 2 μL of deionized distilled water was placed on the surface and imaged for 10 seconds in 14 FPS and processed by onboard software. The results are shown in FIG. 6, and the surface tension is calculated from the dynamic contact angles using the Young-Laplace model. For a blank card plastic overlay sample, the water contact angle (in °) was found to be 103.0.7±2.55, and the surface energy was found to be 68.07±2.56 mN/m. For the latex paint coating, the water contact angle (in °) was found to be 75.61±2.77, and the surface energy was found to be 113.33±14.39 mN/m. For the MAP colloid and latex coating, the water contact angle (in °) was found to be 42.53±1.48, and the surface energy was found to be 140.12±16.43 mN/m. Each measurement generated more than 125 figures and two sets of data were used for each sample, with measurements taken at a temperature of 22.47° C.

Figure 7:
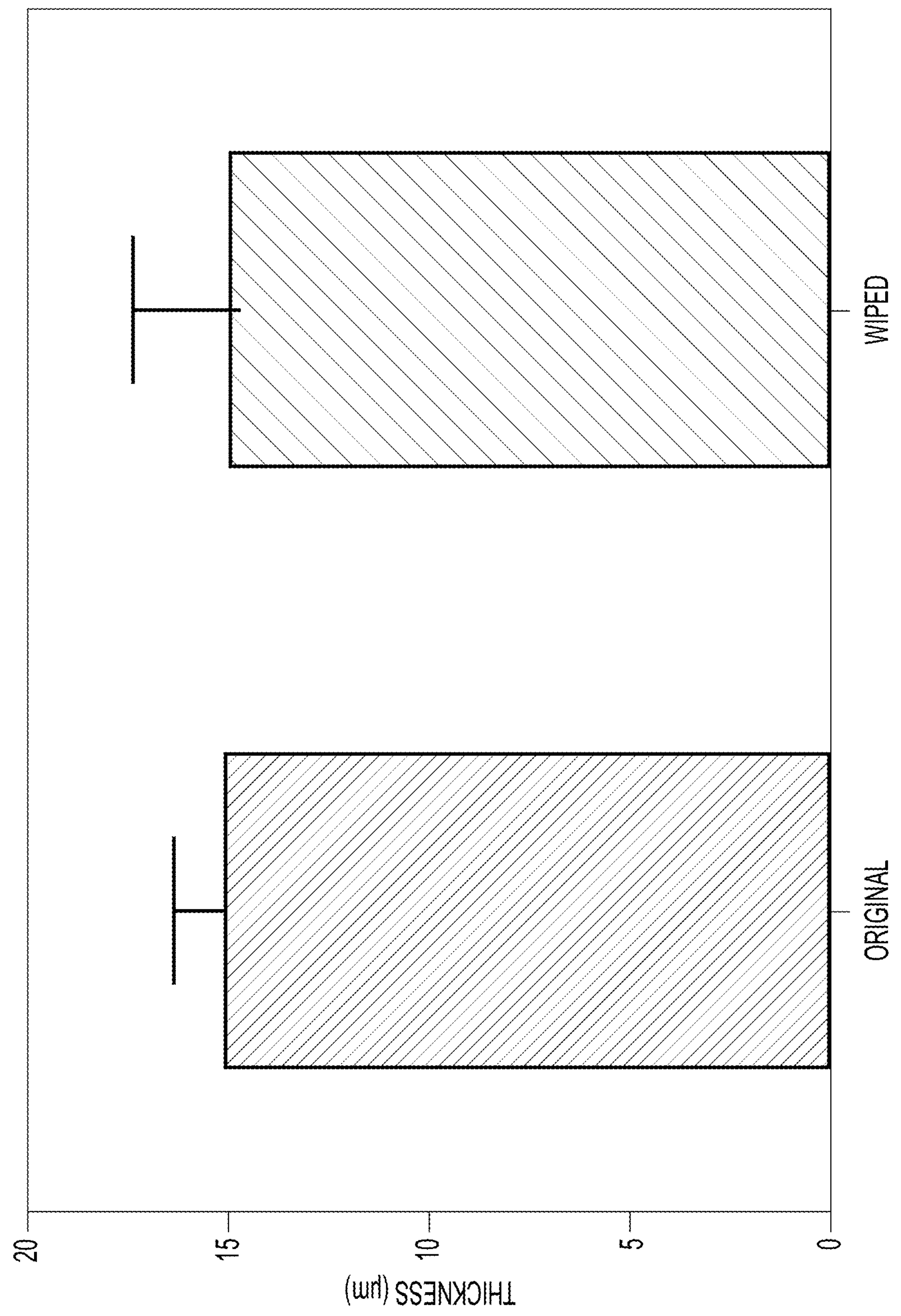
FIG. 7 compares the measured thickness of the plastic card overlay before washing (shown as "original" in FIG. 7) and after washing (shown as "wiped" in FIG. 7).
Figure 8A:
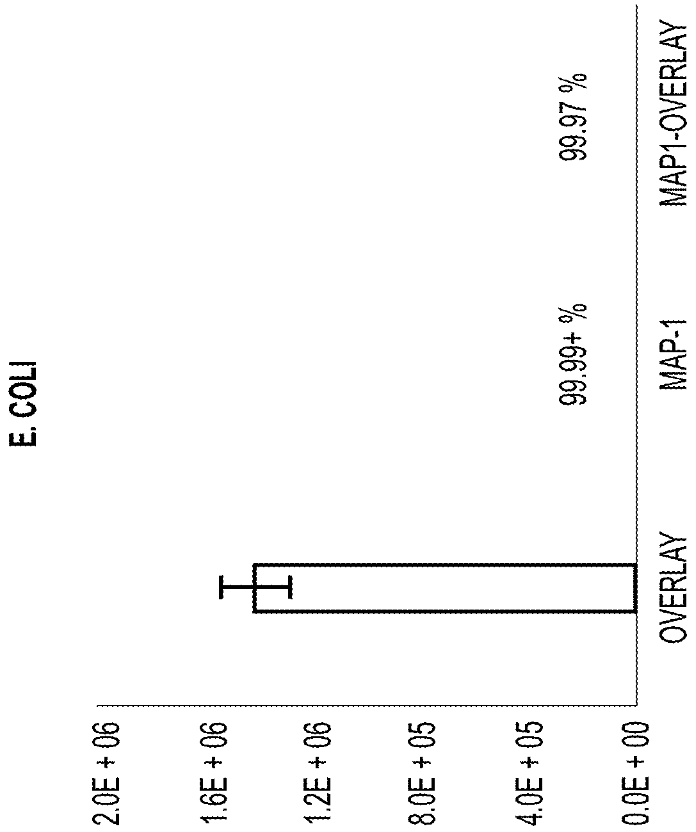
FIG. 8A is a plot showing colony forming units (CFU) for *E. coli* bacteria recovered from blank card plastic overlays, and plastic overlays coated with MAP colloids, and plastic overlays coated with a multilevel antimicrobial polymeric (MAP) colloid and latex coating.
Figure 8B:
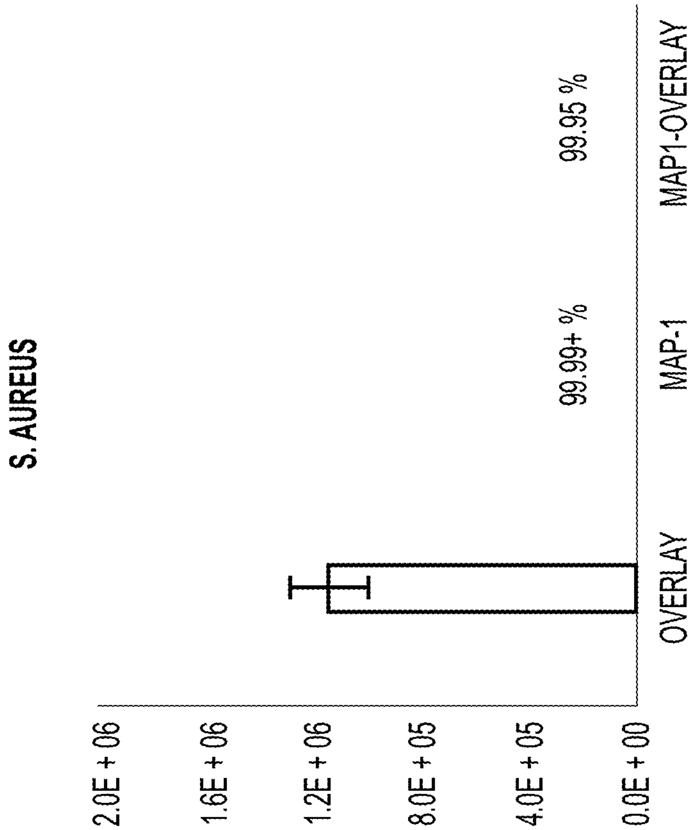
FIG. 8B is a plot showing colony forming units (CFU) for *S. aureus* bacteria recovered from blank card plastic overlays, and plastic overlays coated with MAP colloids, and plastic overlays coated with a multilevel antimicrobial polymeric (MAP) colloid and latex coating.
Figure 8C:
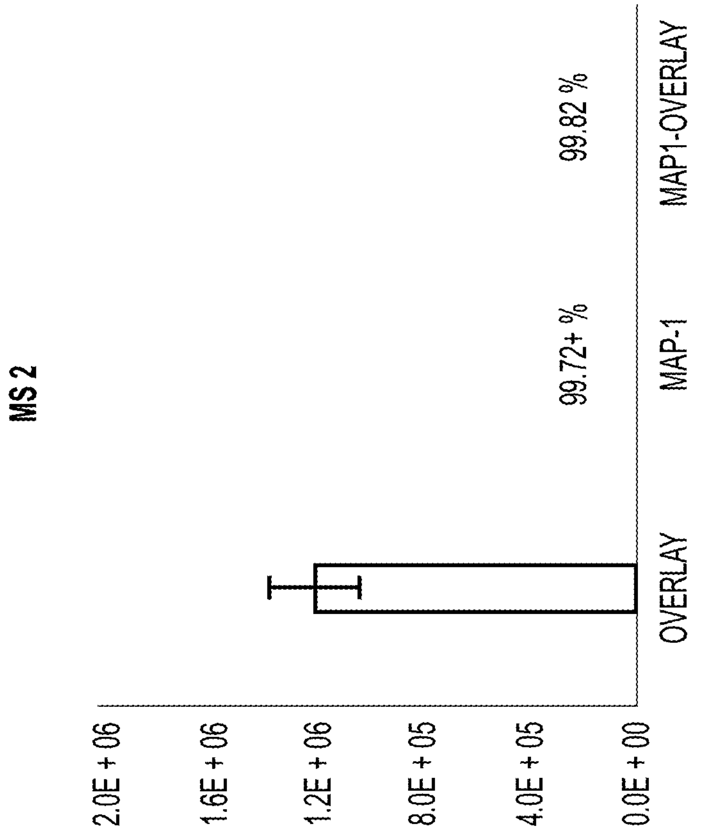
FIG. 8C is a plot showing plaque forming units (PFU) for MS2 bacteriophage recovered from blank card plastic overlays, and plastic overlays coated with MAP colloids, and plastic overlays coated with a multilevel antimicrobial polymeric (MAP) colloid and latex coating.
Figure 8D:
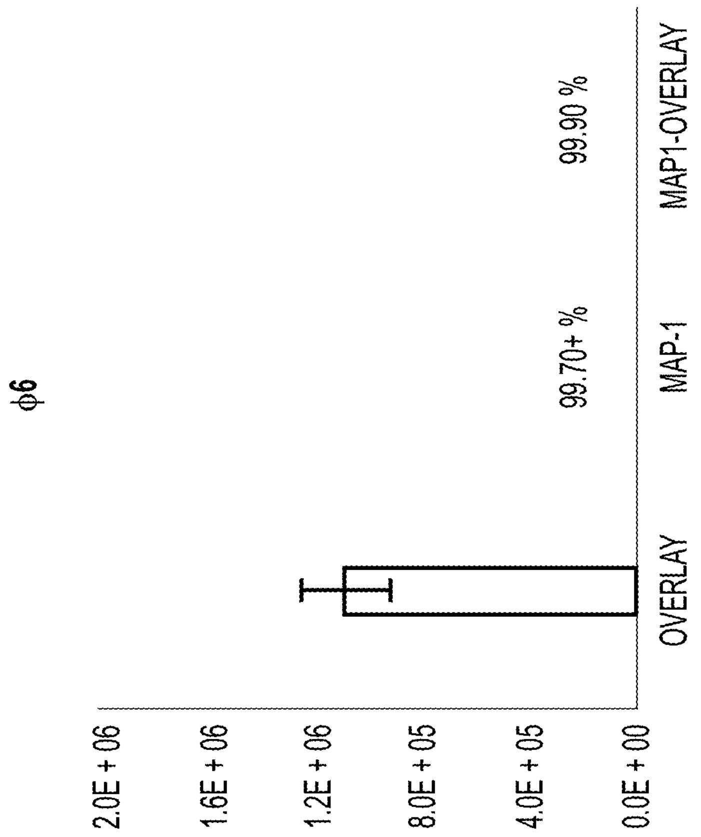
FIG. 8D is a plot showing plaque forming units (PFU) for phi-6 bacteriophage recovered from blank card plastic overlays, and plastic overlays coated with MAP colloids, and plastic overlays coated with a multilevel antimicrobial polymeric (MAP) colloid and latex coating.

A washability test was conducted according to ASTM D4828 and D3450. The coated card plastic overlay was quick-wiped with a slightly wet Scotch-Brite® sponge with a 500 g weight for 100 cycles over a 10 cm×10 cm area. After the test, inspection showed that the general appearance remained unchanged, with slight scratches along one of the edges. The thickness measured using a Digimatic® Micrometer, manufactured by Mitutoyo®, at 10 testing points for each sample. As shown in FIG. 7, the thickness remained the same. In FIG. 7, the thickness results are shown as the net thickness of the overlays without the plastic sheet thickness. However, the roughness as measured by S.D. increased from 1.48 μm to 2.61 μm; i.e., the measured thickness of the primer coating and topcoat paint layer, before and after the washability test, were 14.96±1.48 μm and 14.82±2.61 μm, respectively. Overall, it can be concluded that the primer coating and topcoat paint are durable to washing.

With regard to thermal stability, the coated card plastic overlay was tested according to ISO10373-1 at 50° C., 95% RH for 72 hours. No visual changes in appearance were detected nor was coating delamination observed after the test. Some samples showed slight warpage within the tolerance range of the ISO standard. The results confirmed that the primer coating and topcoat paint are stable for the intended use. Table 4 below shows the results of the ISO10373-1 testing. In Table 4, the average deflection is calculated from four edges of triple repeats. Maximum deflection is the average of the largest warpages. "ND" indicates "not detectable".

TABLE 4

ISO10373-1 test of coated card plastic overlays

| | ISO10373 requirement | Antimicrobial overlay |
|---|---|---|
| Avg. deflection | Δh ≤ 10 mm | Δh avg. = 3.2 ± 2.4 mm |
| Max. deflection | Δh ≤ 10 mm | Δh max. = 8.2 ± 1.0 mm |
| Delamination | ND | ND |
| Visual variation | ND | ND |

The antimicrobial properties of the coated card plastic overlay were tested against Gram-positive *S. aureus* and Gram-negative *E. coli* bacteria, an MS2 bacteriophage as a surrogate for nonenveloped viruses, and phi-6 representing enveloped viruses. Briefly, 25.4 mm×25.4 mm square coupons of the coated card plastic overlay were deliberately challenged with $10^6$ CFU of bacteria and PFU of bacteriophages. After 10 minutes of contact at room temperature (20° C.) and humidity (ca. 60% R.H.), the samples were vortexed in D/E neutralizing broth containing 3% Tween® 80, 3% saponin and 3% lecithin at pH 7.0. It can be seen from FIGS. 8A, 8B, 8C and 8D that the viability of *E. coli, S. aureus*, and the phi-6 bacteriophage decreased by 99.9% while viable MS2 bacteriophage decreased by 99.8% on the MAP colloid and latex coating coated card overlay (represented as "MAP1-overlay" in FIGS. 8A-8D) compared to the blank card overlay (represented as "overlay" in FIGS. 8A-8D). The blank card overlay has no bactericidal or virucidal activities.

Plastic overlays are widely used for interior and exterior decorations in product items, such as credit cards. Hot-press lamination is a common method to fix and strengthen the overlay on plastic, wood, and metal surfaces. The coated card plastic overlays were heat laminated on wood-pulp paper samples, as detailed in Table 5 below. The laminated samples were tested against the panel of microbes listed in Table 6 below for 10 minutes of contact. The blank card plastic overlay served as a negative control. The results in Table 7 below show that the MAP colloid and latex coating remains active against bacteria and viruses. Table 7 shows data from triplicate measurements with the results normalized against negative control (blank card plastic overlay), with 10 minutes of contact at room temperature and 60% R.H. The *E. coli* and *P. aeruginosa* were purchased from the Carolina Biological Supply Co.®, and the *S. aureus* was provided from the Department of Biology of the Hong Kong University of Science and Technology.

TABLE 5

Lamination process

| | industry treatment | lamination |
|---|---|---|
| Superficial film | plastic overlays | coated card plastic overlay |
| Laminated cores | Wood, metal, or plastic substrates | Wood-pulp paper card |
| Experiment details | 120~170° C., ~10 MPa, 20~60 min | 140° C., 10 MPa, 20 min |

TABLE 6

Microbial panel

| Species | Source | Category |
|---|---|---|
| *E. coli* K12 | Carolina 15-5065A | Gram (−) bacteria |
| *P. aeruginosa* | Carolina 15-5250A | Gram (−) bacteria |
| *S. aureus* | HKUST stock | Gram (+) bacteria |
| *E. faecelis* | ATCC 700802 | Gram (+) bacteria |
| MS2 | DSMZ 13767 | Non enveloped virus |
| Phi6 | DSMZ 21518 | Enveloped virus |

TABLE 7

Bactericidal and virucidal results for laminated overlay compared to coated card plastic overlay

| | Gram (−) | | Gram (+) | | | |
|---|---|---|---|---|---|---|
| $Log_{10}$ reduction | *E.* | *P.* | *S.* | *E.* | Phage virus | |
| (Avl2. ± SD) | *coli* | *aeruginosa* | *aureus* | *faecelis* | MS2 | Phi6 |
| Laminated overlay | 99.98 | 99.99 | 98.33 | 99.98 | 98.88 | 99.22 |
| Overlay | 99.99 | 99.99 | 99.61 | 99.99 | 99.11 | 96.91 |

The coated card plastic overlays were laminated on plastic card cores by an industrial lamination process and their antimicrobial properties were tested against the microbial panel listed in Table 6 above. Tests were done on 25.4 mm×25.4 mm square coupons of the test card samples at room conditions with a contact time of 10 minutes. The test conditions comply with the European standard EN 13727 and Table 8 below shows that the bactericidal properties met the requirements of EN 13727, ISO 22196, ASTM E3031, HS L-1902, 2002, and GB-21551.2-2020. The virucidal activity against MS2 and phi-6 bacteriophages is 99.7%. Triplicate measurements with results normalized against negative control (pure latex-coated card plastic), 10 min contact at room temperature and 60% R.H. Note: (a): ISO 22196 stipulates 'active bactericidal' as 'no less than 2 log 10 reductions compared with control'. (b): ASTM E3031 stipulates 'bactericidal' as 'Log reduction no less than natural reduction'. (+)/(−): gram positive or negative.

TABLE 8

Bactericidal and virucidal results for laminated test cards

| Unit: in $log_{10}$ | Antimicrobial results (n = 3) | ISO 22196 (a) | ASTM E3031 (b) |
|---|---|---|---|
| *E. coli* K12 (−) | 3.62 ± 0.48 | ✓ | ✓ |
| *P. aeruginosa* (−) | 5.08 ± 0.21 | ✓ | ✓ |
| *S. aureus* (+) | 3.38 ± 0.14 | ✓ | ✓ |
| *E. faecelis* (+) | 3.88 ± 0.21 | ✓ | ✓ |

TABLE 8-continued

Bactericidal and virucidal results for laminated test cards

| Unit: in $\log_{10}$ | Antimicrobial results (n = 3) | ISO 22196 (a) | ASTM E3031 (b) |
|---|---|---|---|
| MS2 | 2.56 ± 0.21 | ✓ | ✓ |
| Phi6 | 2.56 ± 0.21 | ✓ | ✓ |

Additionally, test cards prepared by industrial lamination of the coated card plastic overlay on plastic cores were subjected to accelerated aging at 55° C. and 75% R.H. for 38 days, which is equivalent of aging for 2.7 years at room temperature according to the "Chinese Technical Standard for disinfection 2002" and one year according to the "US ASTM F1980 standard". ASTM F1980 is widely recommended for sterile surfaces and systems. The aging factor $Q_{10}$ is generally pre-assumed to be 2.0 (which is related to the activation energy Ea during aging). Therefore, the accelerated aging factor (AAF) is 9.84 at 55° C. and 38 days at this condition is equivalent to a year at room temperature (see Table 9 below). The test cards maintained better than 2.2 log reduction (99.4%) against viral particles and higher than 99.0% against bacteria.

TABLE 9

Accelerated aging standards

| Referring standard | Technical Standard For disinfection (2002) | ASTMF1980 - 16: Standard Guide for Accelerated Aging of Sterile Barrier Systems for Medical Devices |
|---|---|---|
| Region/ organization | China | US |
| Accelerated condition | (1) 54~56° C., RH % ≥ 75%, 14 days; (2) 37~40° C., RH % ≥ 75%, 90 days; | Temperature at or below 60° C. (*), RH % not specified. |
| Accelerated aging factor (AAF) | (1) RT 1 year, AAF = 26.07; (2) RT 2 years, AAF = 8.11; RT = 25° C. [7] | AAF = $Q_{10}^{[(T_{AA}-T_{RT})/10]}$ (#); AAF ($T_{AA}$ = 55° C.) = 9.84 (5.3 weeks/38 days as RT 1 year, $Q_{10}$ = 2.0); RT = 20~25° C. |
| Read-out | Chemical compositions; Antimicrobial performance. | Physical properties and integrity; Microbial testing. |

(*) Temperatures higher than 60° C. are not recommended due to the higher probability in many polymeric systems to experience nonlinear changes.
(#) $T_{AA}$ = accelerated aging temperature; $T_{RT}$ = ambient temperature; $Q_{10}$ = aging factor for 10° C. increase or decrease in temperature. Using the Arrhenius equation with $Q_{10}$ equal to 2 is a common and conservative means of calculating an aging factor. ASTM F1980 - 16 is specially designed for sterile barrier systems and packaging materials, i.e., metal, plastic as well as other kinds of coating materials.

TABLE 10

Antimicrobial properties of test cards following accelerated aging (1 year)

| Unit: in Log10 | Day 0 (n = 3) | Day 7 (n = 3) | Day 14 (n = 3) | Day 26 (n = 3) | Day 38 (n = 3) |
|---|---|---|---|---|---|
| *E. coli* | 3.62 ± 0.48 | 2.14 ± 0.15 | 2.14 ± 0.60 | 2.85 ± 0.23 | 2.01 ± 0.53 |
| *S. aureus* | 3.38 ± 0.14 | 2.67 ± 0.42 | 3.67 ± 0.35 | 2.99 ± 0.42 | 3.19 ± 0.48 |
| Phi-6 | 2.56 ± 0.21 | 2.76 ± 0.03 | 2.60 ± 0.25 | 2.60 ± 0.11 | 2.26 ± 0.20 |

For Table 10 above, ISO 22196 stipulates "active bactericidal" as "no less than 2 log 10 reductions compared with control". All results have been normalized with negative controls.

It is to be understood that the multilevel antimicrobial polymeric colloids as functional additives for latex coating are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A multilevel antimicrobial polymeric colloid as a functional additive for latex coatings, comprising a latex coating having multilevel antimicrobial polymeric colloidal particles incorporated therein, wherein the multilevel antimicrobial polymeric colloidal particles each comprise: a polymer scaffold, wherein the polymer scaffold comprises polyvinyl alcohol (PVA);

and at least one antimicrobial polymer carried on the polymer scaffold, wherein the at least one antimicrobial polymer comprises polyethyleneimine (PEI) and polyhexamethylene biguanide (PHMB), and wherein the polymer scaffold and the at least one antimicrobial polymer form a hollow colloidal particle.

2. The multilevel antimicrobial polymeric colloid as a functional additive for latex coatings as recited in claim 1, wherein each of the multilevel antimicrobial polymeric colloidal particles further comprises an antimicrobial core within the hollow colloidal particle.

3. The multilevel antimicrobial polymeric colloid as a functional additive for latex coatings as recited in claim 2, wherein the antimicrobial core comprises an antimicrobial agent selected from the group consisting of antimicrobial metals, antimicrobial metal ions, antimicrobial metal oxides, antimicrobial chemicals, plant-derived antimicrobial phytochemicals, silver, silver compounds, silver salts, silver oxides, copper, copper compounds, copper salts, copper oxides, disinfectants, bactericidal short chain polymers, bactericidal short chain oligomers, ionic liquid compounds, alcohols, peracetic acids, essential oils, and combinations thereof.

4. A method of making a multilevel antimicrobial polymeric colloid as a functional additive for latex coatings, comprising the step of mixing a multilevel antimicrobial polymeric colloid into a latex varnish paint, wherein the multilevel antimicrobial polymeric colloid comprises multilevel antimicrobial polymeric colloidal particles in water, and wherein the multilevel antimicrobial polymeric colloidal particles each comprise:

a polymer scaffold, wherein the polymer scaffold comprises polyvinyl alcohol (PVA); and at least one antimicrobial polymer carried on the polymer scaffold, wherein the at least one antimicrobial polymer comprises polyethyleneimine (PEI) and polyhexamethylene biguanide (PHMB), and wherein the polymer scaffold and the at least one antimicrobial polymer form a hollow colloidal particle.

5. The method of making a multilevel antimicrobial polymeric colloid as a functional additive for latex coatings as recited in claim 4, wherein the latex varnish paint comprises an acrylate-urethane prepolymer emulsion in water.

6. The method of making a multilevel antimicrobial polymeric colloid as a functional additive for latex coatings as recited in claim 4, wherein each of the multilevel antimicrobial polymeric colloidal particles further comprises an antimicrobial core within the hollow colloidal particle.

7. The method of making a multilevel antimicrobial polymeric colloid as a functional additive for latex coatings as recited in claim 6, wherein the antimicrobial core comprises an antimicrobial agent selected from the group consisting of antimicrobial metals, antimicrobial metal ions, antimicrobial metal oxides, antimicrobial chemicals, plant-derived antimicrobial phytochemicals, silver, silver compounds, silver salts, silver oxides, copper, copper compounds, copper salts, copper oxides, disinfectants, bactericidal short chain polymers, bactericidal short chain oligomers, ionic liquid compounds, alcohols, peracetic acids, essential oils, and combinations thereof.

8. An antimicrobial plastic overlay, comprising: a plastic substrate sheet; a primer layer coated on the plastic substrate sheet; and a topcoat layer coated on the primer layer, wherein each of the primer layer and the topcoat layer comprises a multilevel antimicrobial polymeric colloid as a functional additive for latex coatings comprising a latex coating having multilevel antimicrobial polymeric colloidal particles incorporated therein, wherein the multilevel antimicrobial polymeric colloidal particles each comprise: a polymer scaffold, wherein the polymer scaffold comprises polyvinyl alcohol (PVA); and at least one antimicrobial polymer carried on the polymer scaffold, wherein the at least one antimicrobial polymer comprises polyethyleneimine (PEI) and polyhexamethylene biguanide (PHMB), and wherein the polymer scaffold and the at least one antimicrobial polymer form a hollow colloidal particle.

9. The antimicrobial plastic overlay as recited in claim 8, wherein each of the multilevel antimicrobial polymeric colloidal particles further comprises an antimicrobial core within the hollow colloidal particle.

10. The antimicrobial plastic overlay as recited in claim 9, wherein the antimicrobial core comprises an antimicrobial agent selected from the group consisting of antimicrobial metals, antimicrobial metal ions, antimicrobial metal oxides, antimicrobial chemicals, plant-derived antimicrobial phytochemicals, silver, silver compounds, silver salts, silver oxides, copper, copper compounds, copper salts, copper oxides, disinfectants, bactericidal short chain polymers, bactericidal short chain oligomers, ionic liquid compounds, alcohols, peracetic acids, essential oils, and combinations thereof.

* * * * *